United States Patent [11] 3,524,430

| [72] | Inventor | Allan H. Willinger<br>New Rochelle, New York |
|---|---|---|
| [21] | Appl. No. | 755,289 |
| [22] | Filed | Aug. 26, 1968 |
| [45] | Patented | Aug. 18, 1970 |
| [73] | Assignee | Metaframe Corporation<br>a Corp. of Delaware |

[54] AQUARIUM AERATOR ORNAMENT
6 Claims, 3 Drawing Figs.

| [52] | U.S. Cl. | 119/5,<br>43/57, 261/122, 46/92 |
|---|---|---|
| [51] | Int. Cl. | A01k 63/00 |
| [50] | Field of Search | 119/3,5; -<br>261/122,121; 43/57; 46/92; 210/169 |

[56] References Cited
UNITED STATES PATENTS

| 2,166,574 | 7/1939 | Adolphsen | 261/122X |
|---|---|---|---|
| 2,483,561 | 10/1949 | Rauh | 261/122 |
| 2,844,912 | 7/1958 | Sebesta | 46/92 |
| 3,326,185 | 6/1967 | Perez | 119/5 |

*Primary Examiner*— Aldrich F. Medbery
*Attorney*—Friedman and Goodman

ABSTRACT: An aquarium ornament having a mounting element force fit in a mounting opening thereof and an exposed, extending portion connected to an air pump conduit and wherein fibrous material, serving as an airstream diffuser, is mounted on the mounting element over the mounting opening and serves to both hold the mounting element firmly in place and also to release the air supply in the desirable form as a stream of numerous, small bubbles.

Patented Aug. 18, 1970 3,524,430

INVENTOR
ALLAN H. WILLINGER
BY
Friedman & Goodman
ATTORNEYS

AQUARIUM AERATOR ORNAMENT

The present invention relates generally to aquarium ornaments used both to increase the display value of the aquarium and to hold the air supply conduit in a submerged condition, and more particularly to an improved mounting element for completing the connection of the air supply conduit to the aquarium ornament.

As generally understood, there is a constant need to enrich the oxygen content of the water of an aquarium, as by continuously pumping and bubbling air through the water. This obviously necessitates maintaining the remote or free end of the air pump conduit in a submerged condition within the aquarium and is usually achieved by attaching this conduit end to an aquarium ornament. Also as generally understood, the ornament is desirably provided with an appearance of some object having an association with marine life, such as for example an underwater sea diver as in the present case. Whatever the specific form of the ornament, however, there is a requirement for effectively connecting the conduit to it and also for causing the release of the stream of air supplied to it in the more desirable form as small, numerous bubbles. In presently known aquarium ornaments the structure for making the conduit connection and for causing the air bubble stream are separate and independent and are achieved by unnecessarily expensive and accurately dimensioned structural features, the latter being necessary to minimize leakage from the air pump conduit connection to the ornament.

Broadly, it is an object of the present invention to provide an improved aquarium ornament overcoming the foregoing and other shortcomings of the prior art. Specifically, it is an object to provide an improved aquarium ornament in which the air stream diffusing material, having an inherent resiliency resulting from its porosity, is used to advantage not only in converting the air stream into numerous, small bubbles but also in achieving the mounting of the conduit to the ornament without precise interfitting structural features.

An aquarium ornament demonstrating objects and advantages of the present invention includes a body having an external wall bounding an internal compartment and provided with a mounting opening in the external wall opening into the compartment. The mounting element for the conduit is projected into the mounting opening and has appropriately supported thereon one or more bodies of fibrous material which, by virtue of its advantageous interposed position between the end of the mounted conduit and the ornament external wall, is effective to break up the air supplied through the conduit into numerous small bubbles, and which also provides, as a result of an inherent resiliency attributable to its fibrous nature, a force urgency which effectively holds the mounting element firmly in place within the mounting opening.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
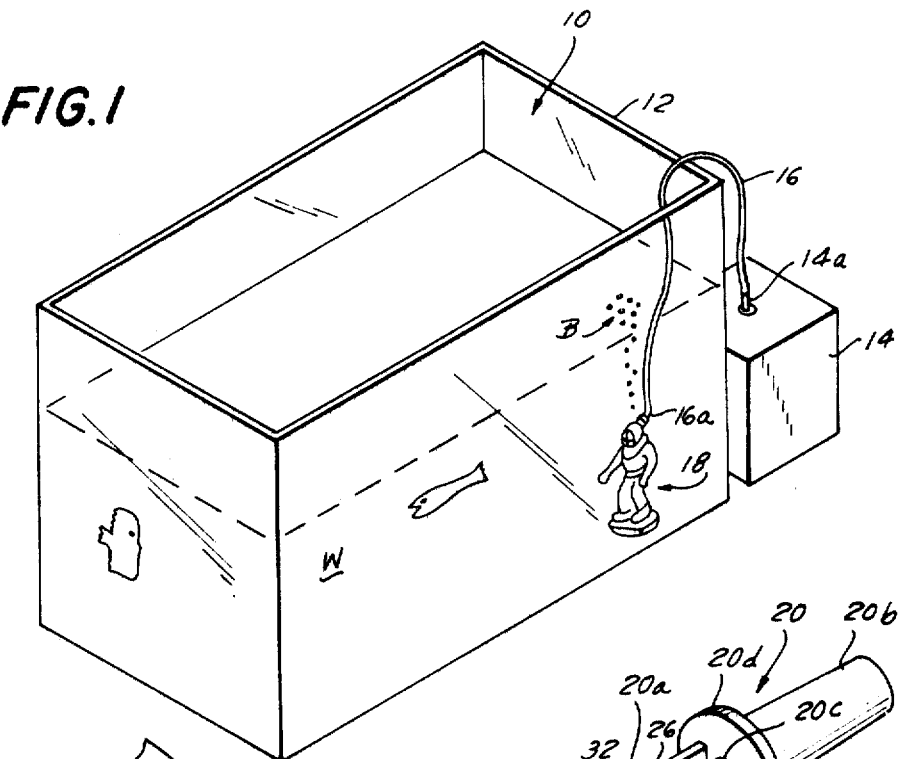
FIG. 1 is a perspective view illustrating the aquarium ornament of the present invention in position within an aquarium.
Figure 2:
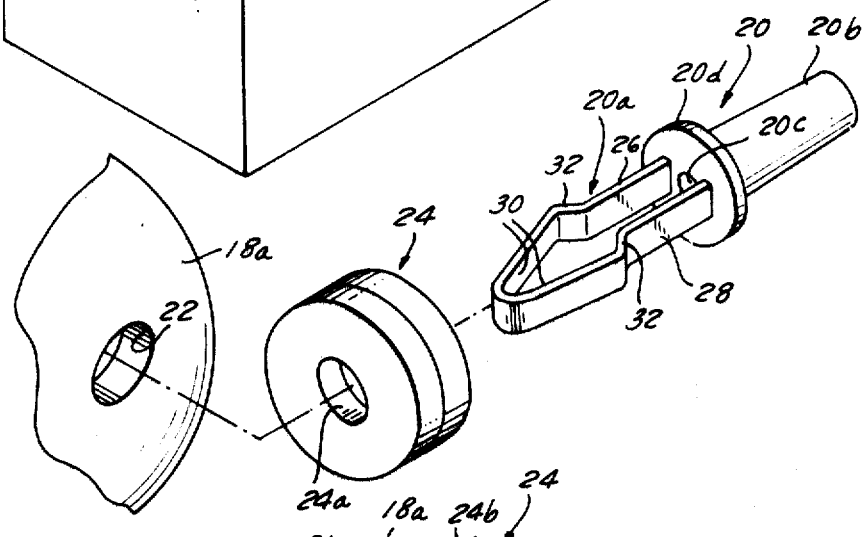
FIG. 2 is a perspective view, on an enlarged scale, of a portion of the ornament, specifically around the mounting opening for the air pump conduit, and of an air-stream diffuser and mounting element according to the present invention.

Reference is now made to the drawings wherein there is shown an aquarium, generally designated as 10, having the usual components of a fish tank 12, an air pump 14 including an outlet 14a to which is attached a flexible tube or conduit 16 having its opposite or free end 16a connected to an aquarium ornament 18. Ornament 18, in the illustrated embodiment, is molded with an ornamental shape of a deep sea diver which, in an obvious manner, contributes to the display interest of the aquarium 10 and which also, due to its weight, serves to hold the conduit end 16a in a submerged condition within the water W of the tank 12. For reasons which are well understood, it is necessary to enrich the oxygen content of the water W and this is preferably achieved by using the air pump 14 to continuously supply air bubbles B to the water. Preferably, the air bubbles B should be individually small and numerous, thereby requiring a diffuser element to break the air stream issuing from the conduit 16 into this desirable form of small, discrete bubbles.

Figure 3:
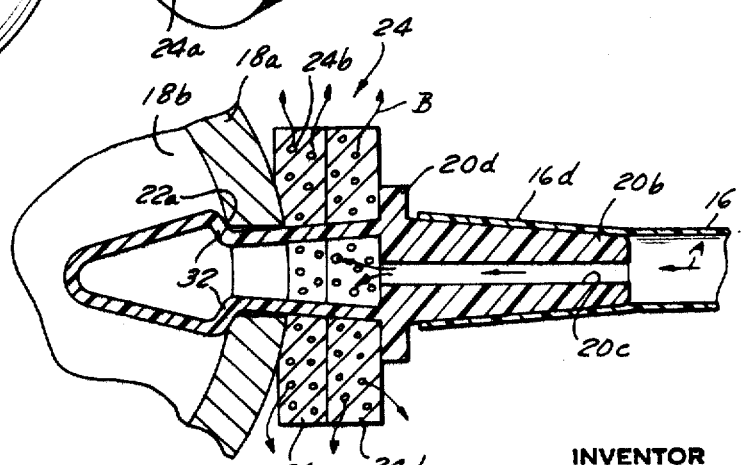
FIG. 3 is a side elevational view, in section, showing the illustrated structure of FIG. 2 in an assembled condition.

The appearance or ornamental aspects of the ornament 18 may vary and still serve the purposes of the present invention so long as it includes an exterior wall 18a which, as best shown in FIG. 3, bounds an internal compartment 18b of a sufficient size and extent to accommodate therein an inserted front portion 20a of a mounting element 20. More particularly, the mounting element portion 20a is projected through a mounting opening 22 which is molded or otherwise appropriately provided in the external wall 18a and leads into the compartment 18b.

Turning now more particularly to the construction of the mounting element 20, the same includes a conduit-engaging portion 20b in the form of a slightly tapered cylinder having a central axial opening 20c, the taper facilitating, in a well understood manner, the plugging in or positioning of the conduit end 16a thereon in a firm friction fit, with the conduit internal air passage in communication with the axial opening 20c. At the large diameter section of the portion 20b, and approximately in the medial portion of the member 20, there is a disk 20d having a laterally oriented peripheral edge. The significance of disk 20d will soon be apparent.

The previously noted mounting element front portion 20a is designed to firmly seat in the mounting opening 22 and thereby hold the conduit-engaging portion 20b in an advantageous position for connection to the conduit 16. Exposed portion 20b just forward of the disk 20d also serves as a support for one or more air-stream diffuser elements 24, all as will soon be described in detail. Portion 20a, more particularly, is formed by two spaced apart plastic sections or legs 26, 28 which extend forward of the disk 20b and then merge into a generally triangular section 30 which is readily guided into the mounting opening 22. Further, the outwardly inclined connecting sections 32 which join the legs 26, 28 to the triangular section 30 are adapted, in practice, to snap behind the internal peripheral edge 22a of the mounting opening 22 and thereby more effectively seat the mounting member 20 in the mounting opening 22. As best understood from FIG. 3, the natural resiliency in the diffuser 24 produces a force which is exerted against the face of the disk 20d and thereby helps to maintain the leg sections or seats 32 in contact with the mounting opening peripheral edge 22a.

Any one of a wide range of porous materials, such as cotton wadding or the like, is suitable as the material of construction for the diffuser 24, this material being preferably shaped as a disk, as illustrated, and provided with a central opening 24a through which the mounting member 20 is projected during its connection to the ornament 18. The fibrous nature of the material of construction of the diffuser 24 provides numerous discrete air passages, individually and collectively designated 24b, which are effective to break up and thereby release the air stream A being supplied through the axial opening 20c into the interior of the diffuser disks 24c, 24d in the more preferred form as the stream of small, numerous bubbles B by the time the air stream passes to the exterior of the disks.

From what has already been described it should be apparent that the diffuser disks 24c, 24d, due to their porosity, have a natural resiliency which contributes a force against the disk 20d and which thus helps in the mounting of mounting member 20. Also, although in the illustrated embodiment this force urgency is achieved with two disks 24c, 24d, it should be readily apparent that by variation in the size of each disk that the same result can be achieved with one or more than two disks.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. The combination with an aquarium air pump and conduit of an aquarium ornament for maintaining the free end of said conduit submerged in said aquarium, said aquarium ornament comprising a body having an exterior wall bounding an internal compartment and having a mounting opening in said wall into said compartment, a mounting member having an operative mounted position with an inserted portion thereof within said mounting opening and an exposed portion extending therefrom and connected to said air pump conduit, and an airstream diffuser fabricated of a porous material operatively arranged on said mounting member over said mounting opening in an interposed position between said exterior wall and said mounted end of said air pump conduit, whereby the air supplied through said conduit is released from said diffuser in the form of a stream of bubbles.

2. An aquarium ornament as defined in Claim 1 wherein said inserted portion of said mounting member comprises a pair of radially outwardly expanding legs effective to engage the portion of said exterior wall bounding said mounting opening, each said leg further having an outwardly oriented section effective to engage the interior peripheral wall edge bounding said mounting opening within said internal compartment to thereby minimize inadvertent disengagement of said mounting member from said mounting opening.

3. An aquarium ornament as defined in Claim 2 wherein said air-stream diffuser is formed by plural members of uniform thickness effective to provide a total thickness of a sufficient extent to cause the firm engagement of said outwardly oriented sections against said interior peripheral wall edge.

4. An aquarium ornament as defined in Claim 3 wherein each diffuser member is a disk having a central opening through which said mounting member is projected to position said disk on said mounting member.

5. A combination with an aquarium air pump and conduit of an aquarium ornament for maintaining the free end of said conduit submerged in said aquarium, said aquarium ornament comprising a body having an exterior wall bounding an internal compartment and having a mounting opening in said wall into said compartment, a mounting member having wall-engaging means formed by a pair of radially outwardly expanding legs effective upon being projected through said mounting opening incident to the mounting of said mounting member therein of engaging said exterior wall bounding said mounting opening, said mounting member having an operative mounted position with said wall-engaging means inserted within said mounting opening and with an exposed portion extending therefrom and connected to said air pump conduit, and an airstream diffuser fabricated of a porous material operatively arranged on said mounting member over said mounting opening in an interposed position between said exterior wall and said mounted end of said air pump conduit whereby the air supplied through said conduit is released from said diffuser in the form of a stream of bubbles.

6. An aquarium ornament as defined in Claim 5 wherein said air-stream diffuser is formed by plural disks each having a central opening through which said mounting member is projected to position said disks on said mounting member.